May 2, 1967 R. V. LITTLE, JR., ETAL 3,317,917
STYLUS BLOCK FOR ELECTRIC WRITING
Filed July 6, 1965
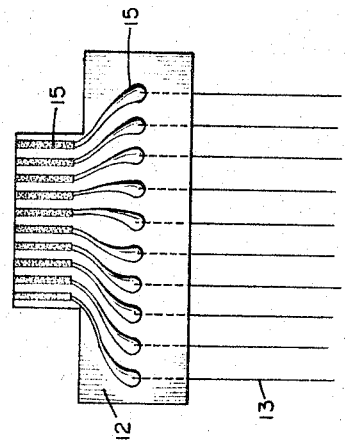
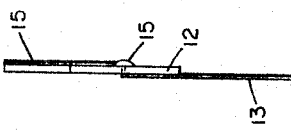
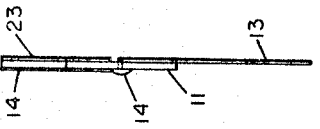
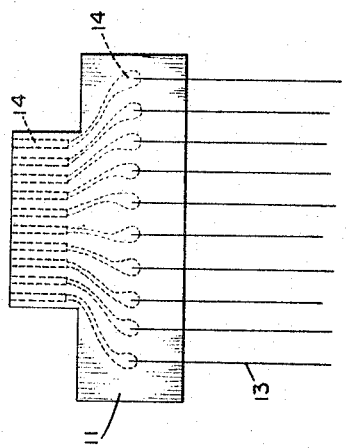
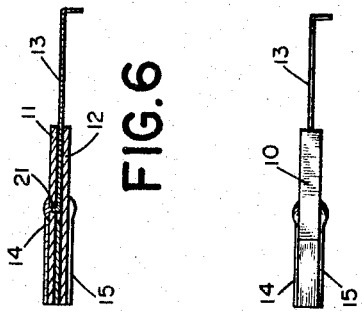
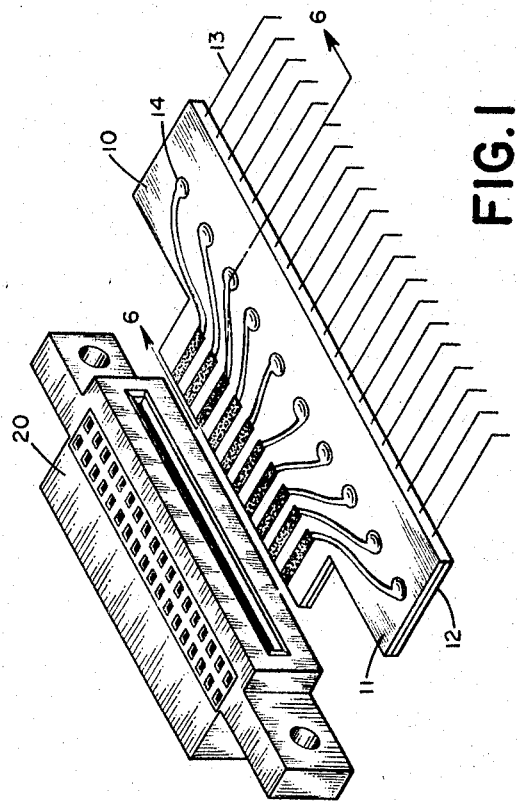
INVENTORS
RALPH V. LITTLE JR.
HAROLD T. MURPHY
BY
*Eber J. Hyde*
ATTORNEY United States Patent Office 3,317,917
Patented May 2, 1967

3,317,917
STYLUS BLOCK FOR ELECTRIC WRITING
Ralph V. Little, Jr., Shaker Heights, and Harold T. Murphy, Cleveland Heights, Ohio, assignors to Clevite Corporation, a corporation of Ohio
Filed July 6, 1965, Ser. No. 469,627
4 Claims. (Cl. 346—139)

This invention pertains to a stylus block for an electric writing system, and to a method for making same.

Many systems are in use today to write on a moving chart to make a permanent record of one or more variable conditions. One system in use involves a spark sensitive record member such as "Teledeltos" paper and a plurality of electrically conductive styli adjacent to or in contact with the sensitive paper. As the paper moves under the styli a record is made when each stylus is energized.

The quality of an electric trace is very much dependent upon the slight pressure of the stylus against the surface of the record member. In order to obtain the optimum stylus pressure for all of a large number of closely spaced styli, it is essential that all of the styli tips lie in a straight line in a plane parallel to the record medium. Also, it is essential that the shanks of the styli lie in a common plane. When these criteria are obtained, proper stylus pressure against the record medium can be achieved by suitable adjustment of the block, thereby obviating individual stylus adjustment.

Multi-stylus systems are used to give as much information as possible in a given width of record member, and accordingly it is desirable to have the styli as close together as possible.

It is an object of the invention to provide a stylus block in which the individual styli are mounted close together with their tips in a straight line, and with their shanks lying in a common plane, and it is a further object to provide an inexpensive method for making the aforesaid stylus block.

A further object of the invention is to provide a replaceable stylus block which can be easily plugged into the system, and which can easily be unplugged for replacement if necessary.

For a better understanding of the present invention, together with other and further objects thereof, reference is had to the following description taken in connection with the accompanying drawings, and its scope will be pointed out in the appended claims.

In the drawing:

FIGURE 1 is an isometric view showing the stylus block of the invention adjacent to a receptacle for connecting it into an electric writing system (not shown), FIGURE 2 is a plan view of one-half of the stylus block, FIGURE 3 is a plan view of the other half of the stylus block, FIGURE 4 is a side view of the half shown in FIGURE 2, FIGURE 5 is a side view of the half shown in FIGURE 3, FIGURE 6 is a sectional view taken along line 6—6 of FIGURE 1, and FIGURE 7 is a side view of the assembled stylus block shown in FIGURE 1.

One aspect of the invention lies in the provision of a stylus block for an electric writing device, comprising first and second printed circuit boards each of which has secured to its inner face a plurality of electrically conductive stylus means which extend over the edge of the board. On the faces of the printed circuit boards opposite the inner face there are secured a plurality of electrically conductive circuits. These circuits connect through the boards to the styli so that each stylus is in electrical contact with a printed electric circuit on the opposite face of the board. The two boards are connected together face to face with the styli staggered and extending in the same direction.

Another aspect of the invention lies in the provision of an inexpensive method of making the printed circuit stylus block, wherein first and second printed circuit boards are provided, preferably though not necessarily similar, and each block has the electrically conductive styli connected to its inner face. The outer face of each block has a plurality of printed circuit electrically conductive paths, one for each stylus, which extends through the board into electrical contact with the styli. The two printed circuit boards are then connected together with the inner faces face to face with the styli staggered or interlaced and all extending in the same direction. Thereafter the styli are trimmed to equal length by a single shearing operation and the tips are simultaneously bent downwardly an equal amount.

With reference to the drawing there is shown in FIGURE 1 a stylus block 10 embodying the present invention. The block 10 is comprised of a first printed circuit board 11 and a second printed circuit board 12 connected together face to face with a plurality of electrically conductive styli 13 extending out in one direction from the center thereof.

On the top face of the block 10 are a plurality of printed circuit connections sufficient for half of the styli, and on the underneath face there is a corresponding number of printed circuit connections 15 (not shown in FIGURE 1) sufficient for the other half of the styli. Each printed circuit connection extends through the board to the center of the block 10 where it is in electrical contact with one stylus, as shown in FIGURE 6. Thus each stylus 13 has its own individual connection to the outside of the block 10, and half of these connections are carried on the top face of the block 10 and the other half are carried on the bottom face of the block. In this manner the styli can be mounted very close together and adequate space is available on the two faces of the block for the printed circuitry.

As shown in FIGURE 1 the stylus block 10 is adapted to plug into a commercially available receptacle 20 which has ten contacts on each of its sides.

Standard printed circuit techniques are available and are well known for making the conductive paths 14, 15 and for making contact through the individual boards to the styli 13.

The preferred method of making the block 10 shown in FIGURE 1 comprises providing the first and second printed circuit boards 11 and 12, shown in FIGURES 2 and 3. Half of the total number of desired styli are secured to the inner face of each board, and half of the printed circuit electrical connections are made on the outer face of each board. As shown in FIGURE 6 the end 21 of each stylus 13 extends through the board from the inner face to the outer face when it is in electrical contact with the printed circuit 14 on the outer face, a drop of solder completing the connection as is known in the printed circuit art.

A spacer 23 which is the thickness of the styli is placed on the inner face of one of the boards, as shown in FIGURE 4, and the two boards 11 and 12 are then secured together at their inner faces. All of the styli extend in one direction. The spacer 23 is located between the boards in the area away from the styli to assure that the boards are essentially parallel to each other after they are secured together.

After the two boards 11, 12 are cemented or otherwise secured together the wires forming the styli are trimmed to equal length, preferably in one trimming operation, and then in a single operation the tips are turned downwardly in a single operation to establish the portion which engages the record member.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A stylus block for an electric writing device comprising: first and second printed circuit boards each having an inner face and an outer face, a plurality of spaced apart electrically conductive stylus means secured to the inner face of each of said boards and extending over the edge thereof, a plurality of electrically conductive circuits secured to the outer face of each of said boards and individually electrically connected through said boards to the said stylus means secured to the inner face, and means securing said two printed circuit boards together with their inner faces face to face, and with the stylus means staggered and extending in the same direction.

2. A stylus block for an electric writing device comprising: a first printed circuit board having an inner face and an outer face, a plurality of spaced apart electrically conductive stylus means secured to the inner face of said first board and extending over the edge of said board, an equal plurality of electrically conductive circuits secured to the outer face of said first board and individually electrically connected through said board to said stylus means, a second printed circuit board similar to said first board, and means securing said two printed circuit boards together at their inner faces, the spaced apart stylus means of each board lying between the spaced apart stylus means of the other board so that each stylus means is insulated from each other stylus means, and all of the stylus means extending away from said block in the same direction.

3. A stylus block as set forth in claim 2, further characterized by spacer means whose thickness is substantially equal to the thickness of said stylus means mounted between said two boards to the rear of said stylus means.

4. A laminated stylus block for an electric writing device comprising: two substantially identical printed circuit boards having an inner face and an outer face, a plurality of spaced apart electrically conductive stylus means secured to the inner face of each of said boards, a corresponding plurality of electrically conductive circuits secured to the outer face of each of said boards and individually connected through said boards to the stylus means on the other side thereof, means securing said two printed circuit boards together face to face at their inner faces with the stylus means of the two boards staggered and spaced apart from each other and extending in the same direction.

References Cited by the Examiner

UNITED STATES PATENTS

| | | | |
|---|---|---|---|
| 2,966,726 | 1/1961 | Gallentine et al. | 29—155.5 |
| 3,074,067 | 1/1963 | Gallentine et al. | 346—139 |
| 3,179,947 | 4/1965 | Crystal et al. | 346—77 |
| 3,267,485 | 8/1966 | Howell et al. | 346—139 |

RICHARD B. WILKINSON, *Primary Examiner.*

J. W. HARTARY, *Assistant Examiner.*